United States Patent
Sun (10) Patent No.: US 8,670,489 B2
(45) Date of Patent: Mar. 11, 2014

(54) METHODS AND SYSTEMS FOR PICTURE UP-SAMPLING

(75) Inventor: Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 120 days.

(21) Appl. No.: 13/461,538

(22) Filed: May 1, 2012

(65) Prior Publication Data

US 2012/0213296 A1    Aug. 23, 2012

Related U.S. Application Data

(62) Division of application No. 11/347,539, filed on Feb. 3, 2006, now Pat. No. 8,175,168.

(60) Provisional application No. 60/663,161, filed on Mar. 18, 2005, provisional application No. 60/683,060, filed on May 20, 2005, provisional application No. 60/686,676, filed on Jun. 1, 2005.

(51) Int. Cl.
*H04N 7/12* (2006.01)

(52) U.S. Cl.
USPC .................................... 375/240.29

(58) Field of Classification Search
USPC ........................ 375/240.01, 240.29
IPC ........................................ H04N 7/12
See application file for complete search history.

(56) References Cited

U.S. PATENT DOCUMENTS

| | | | |
|---|---|---|---|
| 5,182,645 A | 1/1993 | Breeuwer et al. | |
| 6,184,935 B1 | 2/2001 | Iaquinto et al. | |
| 6,330,280 B1 | 12/2001 | Suzuki et al. | |
| 6,373,592 B1 | 4/2002 | Ito | |
| 6,756,985 B1 | 6/2004 | Hirotsune | |
| 6,873,655 B2 | 3/2005 | Comer et al. | |
| 2002/0090028 A1 | 7/2002 | Comer et al. | |
| 2002/0114391 A1 | 8/2002 | Yagasaki et al. | |
| 2003/0081679 A1 | 5/2003 | Kesaniemi | |
| 2003/0112864 A1 | 6/2003 | Karczewicz | |

FOREIGN PATENT DOCUMENTS

| | | |
|---|---|---|
| JP | 7107464 A | 4/1995 |
| JP | 7212761 A | 8/1995 |
| JP | 10-134175 A | 5/1998 |
| JP | 2000-036032 A | 2/2000 |
| WO | 2006/087314 A1 | 8/2006 |

OTHER PUBLICATIONS

Japanese Office Action—Patent Application No. 2008-501901—Mailing Date: Mar. 30, 2010.
Chinese Office Action—Application No. 200680016560.X—Issuing Date: Jun. 2, 2010.
Supplementary European Search Report—EP 06 73 6426—Date: Jul. 23, 2010.
Supplementary European Search Report—EP 06 73 6424—Date: Aug. 10, 2010.

(Continued)

*Primary Examiner* — Young Lee
(74) *Attorney, Agent, or Firm* — Kristine Elizabeth Matthews; David C. Ripma (57) ABSTRACT

Aspects of the present invention relate to systems and methods for picture up-sampling using direct interpolation. Some aspects of the present invention provide an up-sampling procedure designed for the Scalable Video Coding extension of H.264/MPEG-4 AVC.

11 Claims, 5 Drawing Sheets

(56) References Cited

OTHER PUBLICATIONS

Julien Reichel (editor), "Working Draft 1.0 of 14496-10:200x/AMD1 Scalable Video Coding," ISO/IEC JTC1/SC29/WG11 and ITU-T SG16 Q.6, N6901, Jan. 2005, Hong Kong, China.
Japanese Office Action—Patent Application No. 2008-501903—Mailing Date: Oct. 12, 2010.
Thomas Wiegand et al., "Overview of the H.264/AVC Video Coding Standard," IEEE Transactions on Circuits and Systems for Video Technology, vol. 13, No. 7, pp. 560-576, Jul. 2003.
Korean Application No. 10-2007-7023737—Korean Office Action dated Jun. 1, 2009.
PCT/US2006/007104—International Preliminary Report on Patentability dated Mar. 17, 2009 and including Written Opinion of the International Searching Authority dated Jan. 31, 2008.
Shijun Sun, "Extended Spatial Scalability with Picture-Level Adaptation," Joint Video Team of ISO/MPEG and ITU-TVCEG, Doc. JVT-O008, Busan, Korea, Apr. 2005 * entire document *.
E. Francois and S. Sun, "Core Experiments on Extended Spatial Scalability (CE-10)," Joint Video Team of ISO/MPEG and ITU-T VCEG, Doc. JVT-O310, Busan, Korea, Apr. 2005 * entire document *.
Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005 * section 8.4.2.2.1 *.
Edouard Francois, Extended spatial scalability, International Organisation for Standardisation Organisation Internationale De Normalisation,ISO/IEC JTC1/SC29/WG11, Coding of Moving Pictures and Audio, ISO/IEC JTC1/SC29/WG11, MPEG2005/M11669, Jan. 2005, Hong Kong, China.
International Organisation for Standardisation, Organisation Internationale De Normalisation, Coding of Moving Pictures and Audio, ISO/IEC JTC1/SC29/WG11/N6898, Hong Kong, Jan. 2005.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant sections 5 and 6*.
Ken Turkowski, "Filters for Common Resampling Tasks", Graphics Gems I, Academic Press, Apple Computer, Apr. 1990.
Japanese Office Action—Patent Application No. 2008-501901—Mailing Date Oct. 20, 2009.
"Description of Core Experiments in SVC-CE10. Non dyadic scalability," JVT-N025 draft 0, Hong Kong, Jan. 2005.
Korean Notice of Allowance—Application No. 10-2007-7023189—Oct. 23, 2009.
USPTO Office Action—U.S. Appl. No. 11/347,539—Mail Date Feb. 27, 2008.
USPTO Office Action—U.S. Appl. No. 11/347,539—Mail Date Jun. 23, 2009.
USPTO Office Action—U.S. Appl. No. 11/347,539—Mail Date Feb. 13, 2009.
USPTO Office Action—U.S. Appl. No. 11/347,539—Notification Date Dec. 9, 2009.
USPTO Office Action—U.S. Appl. No. 11/347,539—Mail Date Sep. 29, 2008.
USPTO Office Action—U.S. Appl. No. 11/347,539—Notification Date Nov. 19, 2010.
USPTO Office Action—U.S. Appl. No. 11/347,539—Notification Date May 6, 2010.
USPTO Office Action—U.S. Appl. No. 11/347,539—Mail Date Jun. 12, 2008.

METHODS AND SYSTEMS FOR PICTURE UP-SAMPLING

CROSS REFERENCE TO RELATED REFERENCES

This application is a division of U.S. patent application Ser. No. 11/347,539, filed Feb. 3, 2006, U.S. Pat. No. 8,175,168, which claims the benefit of U.S. Provisional Patent Application No. 60/663,161, entitled "Extended spatial scalability with picture-level adaptation," filed Mar. 18, 2005, invented by Shijun Sun; U.S. patent application Ser. No. 11/347,539 also claims the benefit of U.S. Provisional Patent Application No. 60/683,060, entitled "Direct interpolation for up-sampling in extended spatial scalability," filed May 20, 2005, invented by Shijun Sun; and U.S. patent application Ser. No. 11/347,539 also claims the benefit of U.S. Provisional Patent Application No. 60/686,676, entitled "Deblocking filter method with reduced complexity for spatial scalable video coding," filed Jun. 1, 2005, invented by Shijun Sun; said application, U.S. patent application Ser. No. 11/347,539, is hereby incorporated by reference herein, in its entirety.

FIELD OF THE INVENTION

Embodiments of the present invention comprise methods and systems for picture up-sampling. Some embodiments of the present invention comprise methods and systems for picture up-sampling for spatially scalable video coding.

BACKGROUND

H.264/MPEG-4 AVC [Joint Video Team of ITU-T VCEG and ISO/IEC MPEG, "Advanced Video Coding (AVC)-4$^{th}$ Edition," ITU-T Rec. H.264 and ISO/IEC 14496-10 (MPEG4-Part 10), January 2005], which is incorporated by reference herein, is a video codec specification that uses macroblock prediction followed by residual coding to reduce temporal and spatial redundancy in a video sequence for compression efficiency. Spatial scalability refers to a functionality in which parts of a bitstream may be removed while maintaining rate-distortion performance at any supported spatial resolution. Single-layer H.264/MPEG-4 AVC does not support spatial scalability. Spatial scalability is supported by the Scalable Video Coding (SVC) extension of H.264/MPEG-4 AVC.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between spatial layers is exploited by inter-layer prediction mechanisms. Three inter-layer prediction techniques are included into the design of the SVC extension of H.264/MPEG-4 AVC: inter-layer motion prediction, inter-layer residual prediction, and inter-layer intra texture prediction.

Previously, only dyadic spatial scalability was addressed by SVC. Dyadic spatial scalability refers to configurations in which the ratio of picture dimensions between two successive spatial layers is a power of 2. New tools that manage configurations in which the ratio of picture dimensions between successive spatial layers is not a power of 2 and in which the pictures of the higher level can contain regions that are not present in corresponding pictures of the lower level, referred to as non-dyadic scaling with cropping window, have been proposed.

All of the inter-layer prediction methods comprise picture up-sampling. Picture up-sampling is the process of generating a higher resolution image from a lower resolution image. Some picture up-sampling processes comprise sample interpolation. The prior up-sampling process used in the SVC design was based on the quarter luma sample interpolation procedure specified in H.264 for inter prediction. When applied to spatially scalable coding, the prior method has the following two drawbacks: the interpolation resolution is limited to quarter samples, and thus, is not supportive of non-dyadic scaling; and half-sample interpolation is required in order to get a quarter-sample position making this method computationally cumbersome. A picture up-sampling process that overcomes these limitations is desired.

SUMMARY

Embodiments of the present invention comprise picture up-sampling accomplished through direct interpolation using filter coefficients selected based on the phase of the location of the pixel to be interpolated.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
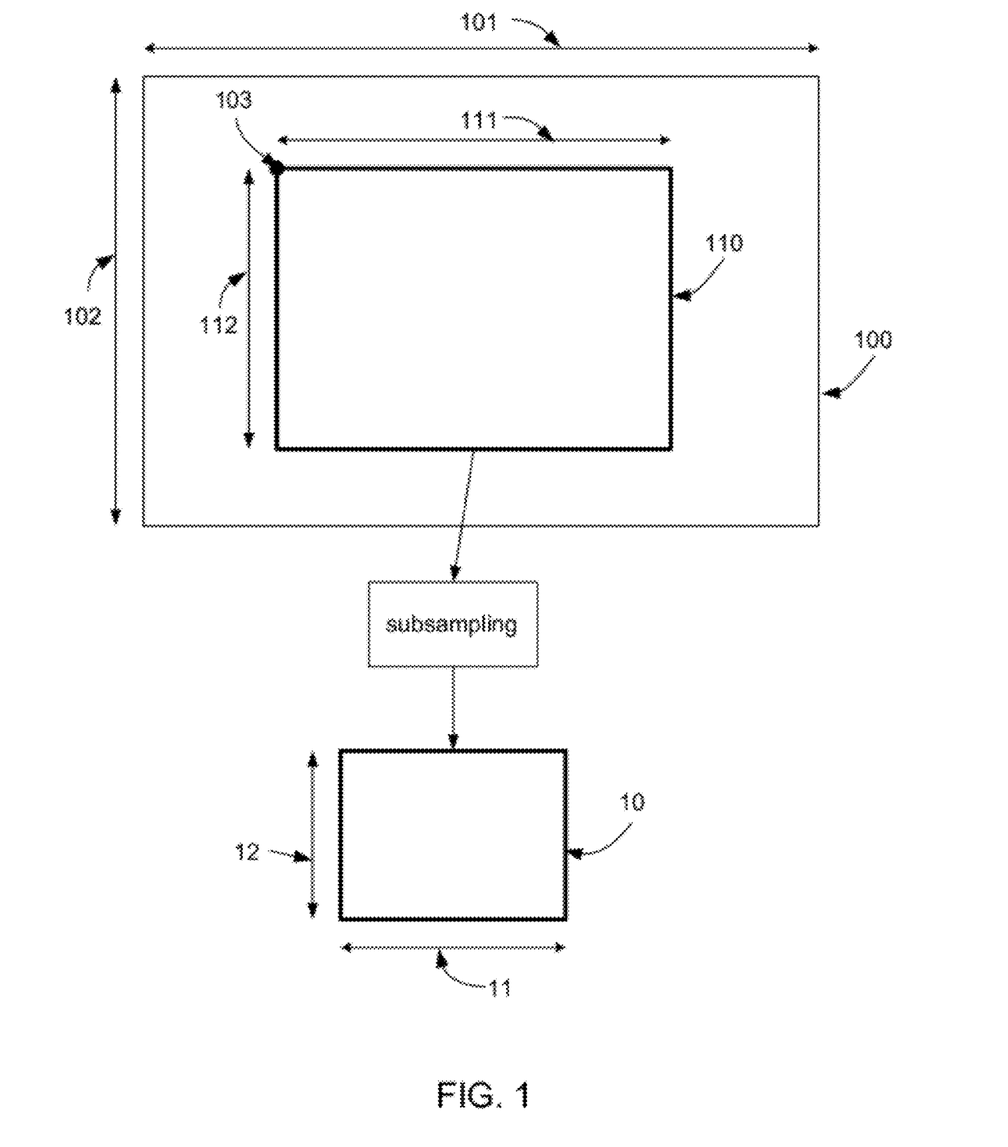
FIG. 1 is diagram illustrating the geometrical relationship between an enhancement layer and a base layer.

For the purposes of this specification and claims, the term "picture" may comprise an array of pixels, a digital image, a subdivision of a digital image, a data channel of a digital image or another representation of image data. FIG. 1 shows two pictures corresponding to an image picture: a lower spatial picture 10, also referred to as a base spatial picture or base-layer picture, and a higher spatial picture 100, also referred to as an enhancement spatial picture or enhancement-layer picture. The base spatial picture 10 may have lower spatial resolution than the enhancement spatial picture 100, as shown in FIG. 1. The base spatial picture 10 may not include the same spatial region as that of the enhancement spatial picture 100, as shown in FIG. 1. Shown in FIG. 1 is a base spatial picture 10 corresponding to a spatial region 110 cropped from the enhancement spatial picture 100.

In some embodiments of the present invention, the base spatial picture and the enhancement spatial picture may correspond to two spatial layers in a scalable video coder/decoder (codec).

The width 101 of the enhancement spatial picture 100 and the height 102 of the enhancement spatial picture 100 can be denoted $w_e$ and $h_e$, respectively. The width 11 and the height 12 of the base spatial picture 10 can be denoted $w_b$ and $h_b$, respectively. The base spatial picture 10 may be a sub-sampled version of a sub-region 110 of the enhancement spatial picture 100 positioned at enhancement spatial picture coordinates ($x_{orig}$, $y_{orig}$) 103. The position 103 represents the position of the upper-left corner of the cropping window 110. The width 111 and the height 112 of the sub-region 110 can be denoted $w_{ex}$ and $h_{ex}$, respectively. The parameters ($x_{orig}$, $y_{orig}$, $w_{ex}$, $h_{ex}$, $w_b$, $h_b$) define the relationship between the higher spatial picture 100 and the lower spatial picture 10.

Figure 2:
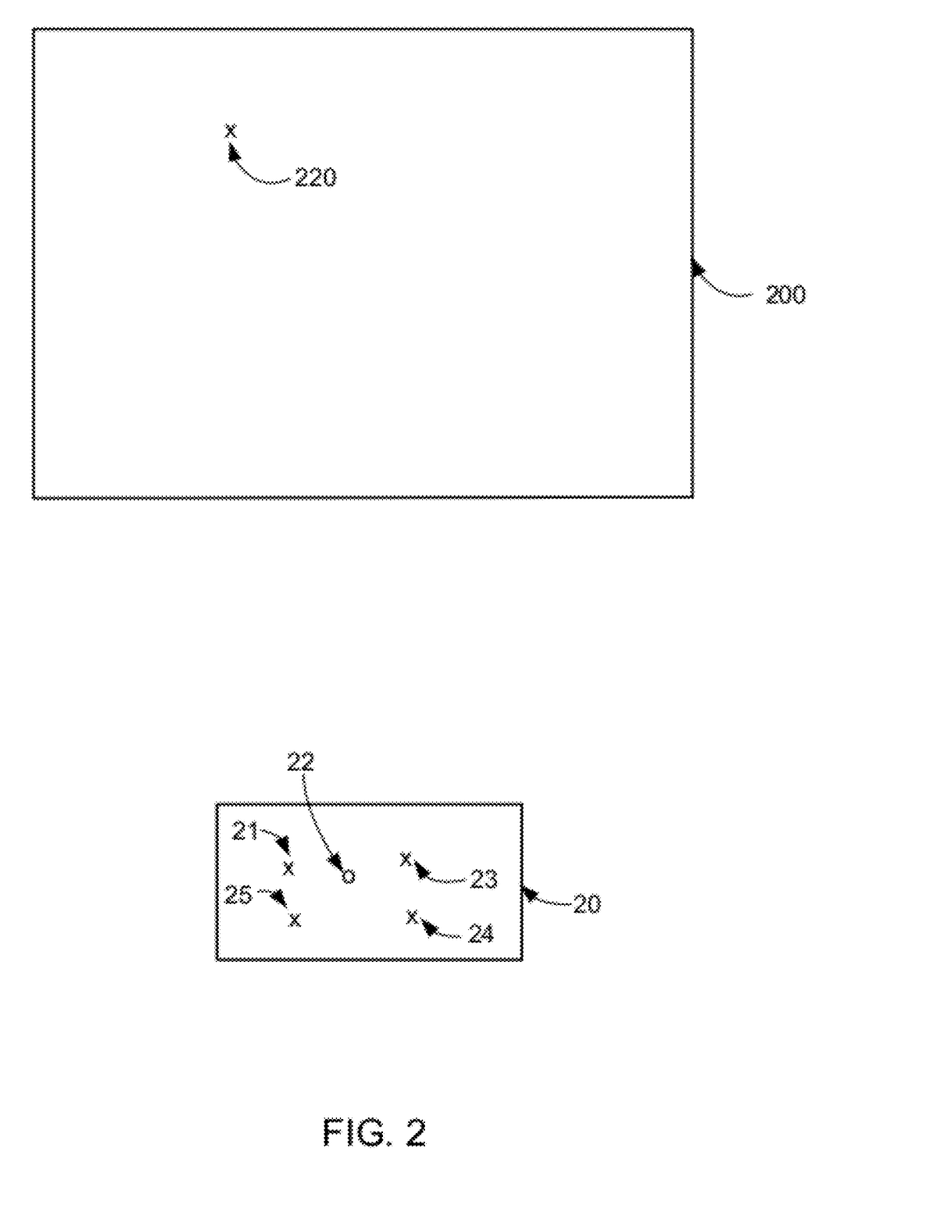
FIG. 2 is a diagram showing the relative location of a sample in an enhancement layer and a base layer.

Picture up-sampling may refer to the generation of a higher spatial resolution image from a lower spatial resolution image. In some embodiments, up-sampling may refer to increasing resolution in any dimension not limited to spatial dimensions or a temporal dimension. FIG. 2 shows a pixel location 220 in a higher spatial resolution image 200. In FIG. 2, pixel location 220 has a corresponding location 22 in the lower spatial resolution image 20. The location 220 may align directly with a pixel location in the lower spatial resolution image 20, or it may not align directly with a pixel location in the lower spatial resolution image 20. In FIG. 2, the location 22 is shown located between four base-layer pixels, 21, 23, 24, and 25.

Some embodiments of the present invention comprise methods and systems for direct interpolation of the pixels of the enhancement spatial picture 200 given the base spatial picture 20 wherein the ratios of dimensions are not limited to a power of 2. Some embodiments of the present invention comprise up-sampling on the entire picture of the base spatial picture 20. Other embodiments of the present invention comprise block-by-block up-sampling of the base spatial picture 20. Some embodiments of the present invention comprise up-sampling in one direction followed by up-sampling in another direction.

For a sample position (x, y) in the enhancement spatial picture in units of integer samples, the corresponding position ($p_{x,L}(x)$, $p_{y,L}(y)$) in the base spatial picture, in units of $$\frac{1}{R_L}$$

samples, may be given by:

$$\begin{cases} p_{x,L}(x) = \left[(x - x_{orig}) \cdot w_b \cdot R_L + \frac{R_L}{2}(w_b - w_{ex})\right] / w_{ex} \\ p_{y,L}(y) = \left[(y - y_{orig}) \cdot h_b \cdot R_L + \frac{R_L}{2}(h_b - h_{ex})\right] / h_{ex} \end{cases}$$

where the parameters ($x_{orig}$, $y_{orig}$, $w_{ex}$, $h_{ex}$, $w_b$, $h_b$) define the relationship between the higher spatial picture 100 and the lower spatial picture 10, as in FIG. 1, and $R_L$ is the interpolation resolution. Some embodiments comprise one-sixteenth-sample resolution interpolation, and in such embodiments $R_L$ is 16.

In some embodiments, the corresponding position ($p_{x,L}(x)$, $p_{y,L}(y)$) in the base spatial picture 10 may be given by:

$$\begin{cases} p_{x,L}(x) = \left[(x - x_{orig}) \cdot w_b \cdot R_L + \frac{R_L}{2}(w_b - w_{ex})\right] // w_{ex} \\ p_{y,L}(y) = \left[(y - y_{orig}) \cdot h_b \cdot R_L + \frac{R_L}{2}(h_b - h_{ex})\right] // h_{ex} \end{cases}$$

where, as above, the parameters ($x_{orig}$, $y_{orig}$, $w_{ex}$, $h_{ex}$, $w_b$, $h_b$) define the relationship between the higher spatial picture 100 and the lower spatial picture 10, as in FIG. 1, $R_L$ is the interpolation resolution, and "//" comprises a computationally simplified division operation. The sample positions may not be limited to powers of 2, and direct calculation of a sample position allows for direct interpolation of picture values at that sample position.

In some embodiments, interpolating the enhancement-layer image value at sample position (x, y) in the enhancement spatial picture comprises a filtering process. The filtering process may further comprise determining interpolation-filter coefficients from a look-up-table wherein the index into the look-up-table may be related to the interpolation position determined by ($p_{x,L}(x)$, $p_{y,L}(y)$).

In some embodiments, the interpolation filter may be a 4-tap filter. In some embodiments, the interpolation filter may be a 6-tap filter. In some embodiments, the filter coefficients may be derived from the two-lobed or three-lobed Lanczos-windowed sinc functions.

Table 1 and Table 2 comprise exemplary look-up-tables of interpolation-filter coefficients for a 16-phase 6-tap interpolation filter wherein the phase corresponds to the interpolation position determined by ($p_{x,L}(x)$, $p_{y,L}(y)$).

TABLE 1

| | (6-tap) interpolation filter coefficients | | | | | |
|---|---|---|---|---|---|---|
| phase | e[−2] | e[−1] | e[0] | e[1] | e[2] | e[3] |
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |
| 3 | 1 | −4 | 30 | 7 | −2 | 0 |
| 4 | 1 | −4 | 28 | 9 | −2 | 0 |
| 5 | 1 | −5 | 27 | 11 | −3 | 1 |
| 6 | 1 | −5 | 25 | 14 | −3 | 0 |
| 7 | 1 | −5 | 22 | 17 | −4 | 1 |
| 8 | 1 | −5 | 20 | 20 | −5 | 1 |
| 9 | 1 | −4 | 17 | 22 | −5 | 1 |
| 10 | 0 | −3 | 14 | 25 | −5 | 1 |
| 11 | 1 | −3 | 11 | 27 | −5 | 1 |
| 12 | 0 | −2 | 9 | 28 | −4 | 1 |
| 13 | 0 | −2 | 7 | 30 | −4 | 1 |
| 14 | 0 | −1 | 4 | 31 | −3 | 1 |
| 15 | 0 | 0 | 2 | 32 | −2 | 0 |

TABLE 2

| | (6-tap) interpolation filter coefficients | | | | | |
|---|---|---|---|---|---|---|
| phase | e[−2] | e[−1] | e[0] | e[1] | e[2] | e[3] |
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |
| 3 | 1 | −4 | 30 | 6 | −1 | 0 |
| 4 | 1 | −4 | 28 | 9 | −2 | 0 |
| 5 | 1 | −4 | 27 | 11 | −3 | 0 |
| 6 | 1 | −5 | 25 | 14 | −3 | 0 |
| 7 | 1 | −5 | 22 | 17 | −4 | 1 |
| 8 | 1 | −5 | 20 | 20 | −5 | 1 |
| 9 | 1 | −4 | 17 | 22 | −5 | 1 |
| 10 | 0 | −3 | 14 | 25 | −5 | 1 |
| 11 | 0 | −3 | 11 | 27 | −4 | 1 |
| 12 | 0 | −2 | 9 | 28 | −4 | 1 |
| 13 | 0 | −1 | 6 | 30 | −4 | 1 |
| 14 | 0 | −1 | 4 | 31 | −3 | 1 |
| 15 | 0 | 0 | 2 | 32 | −2 | 0 |

Table 3 comprises a look-up-table of interpolation-filter coefficients for a 16-phase 4-tap interpolation filter wherein the phase corresponds to the interpolation position determined by ($p_{x,L}(x)$, $p_{y,L}(y)$).

TABLE 3

| | (4-tap) interpolation filter coefficient | | | |
|---|---|---|---|---|
| phase | e[−1] | e[0] | e[1] | e[2] |
| 0 | 0 | 128 | 0 | 0 |
| 1 | −4 | 127 | 5 | 0 |
| 2 | −8 | 124 | 13 | −1 |
| 3 | −10 | 118 | 21 | −1 |
| 4 | −11 | 111 | 30 | −2 |
| 5 | −11 | 103 | 40 | −4 |
| 6 | −10 | 93 | 50 | −5 |
| 7 | −9 | 82 | 61 | −6 |
| 8 | −8 | 72 | 72 | −8 |
| 9 | −6 | 61 | 82 | −9 |
| 10 | −5 | 50 | 93 | −10 |
| 11 | −4 | 40 | 103 | −11 |
| 12 | −2 | 30 | 111 | −11 |
| 13 | −1 | 21 | 118 | −10 |
| 14 | −1 | 13 | 124 | −8 |
| 15 | 0 | 5 | 127 | −4 |

Figure 3:
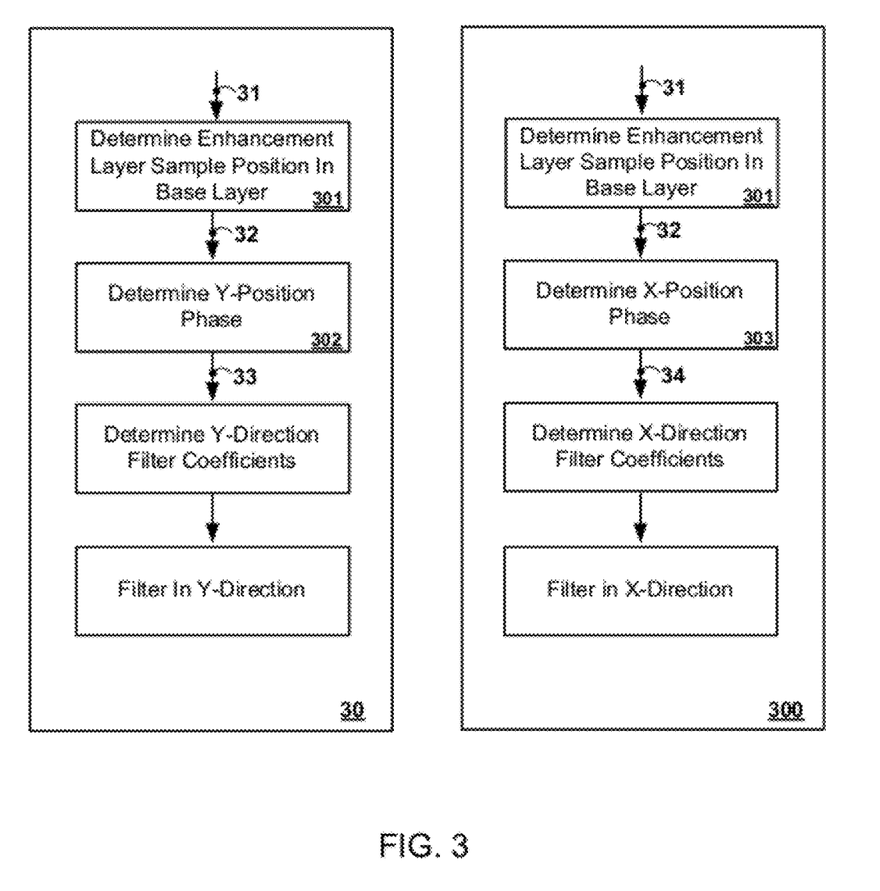
FIG. 3 is a flow diagram of an embodiment of the present invention comprising interpolation filtering in two directions.

Some embodiments of the current invention are illustrated in FIG. 3. Interpolation in the x- and y-directions may be done in separate passes, 300 and 30, respectively. In some embodiments, each pass may be performed within a macroblock or another sub-division of the image. In other embodiments, each pass may be performed within the entire image.

For a sample position in the enhancement layer 31, i.e., the location of an enhancement-layer pixel, the corresponding position in the base layer 32 may be determined 301. The offset, or phase, in each direction, y-position phase 33 and x-position phase 34, of the sample in the base layer from an integer base-layer pixel location may be determined, 302 and 303, respectively, from the corresponding base-layer pixel position 32 of an enhancement-layer pixel position 31. The offset or phase may be determined in units of interpolation resolution. For example, for an interpolation resolution of one-sixteenth, a phase of 0 may correspond to no offset from a base-layer pixel position. A phase of 8 may correspond to an enhancement-layer pixel that falls, in one dimension, half-way between base-layer pixel positions.

The interpolation filter coefficients may be determined by look-up-table in which the y-position phase 33 may be the index when interpolating in the y-direction, or the x-position phase 34 may be the index when interpolating in the x-direction. The position interpolation center, for a given direction, is the pixel location in the base layer with respect to which the position phase may be measured. In some embodiments of the current invention, the position interpolation center is the pixel location to which the filter is centered.

Figure 4:
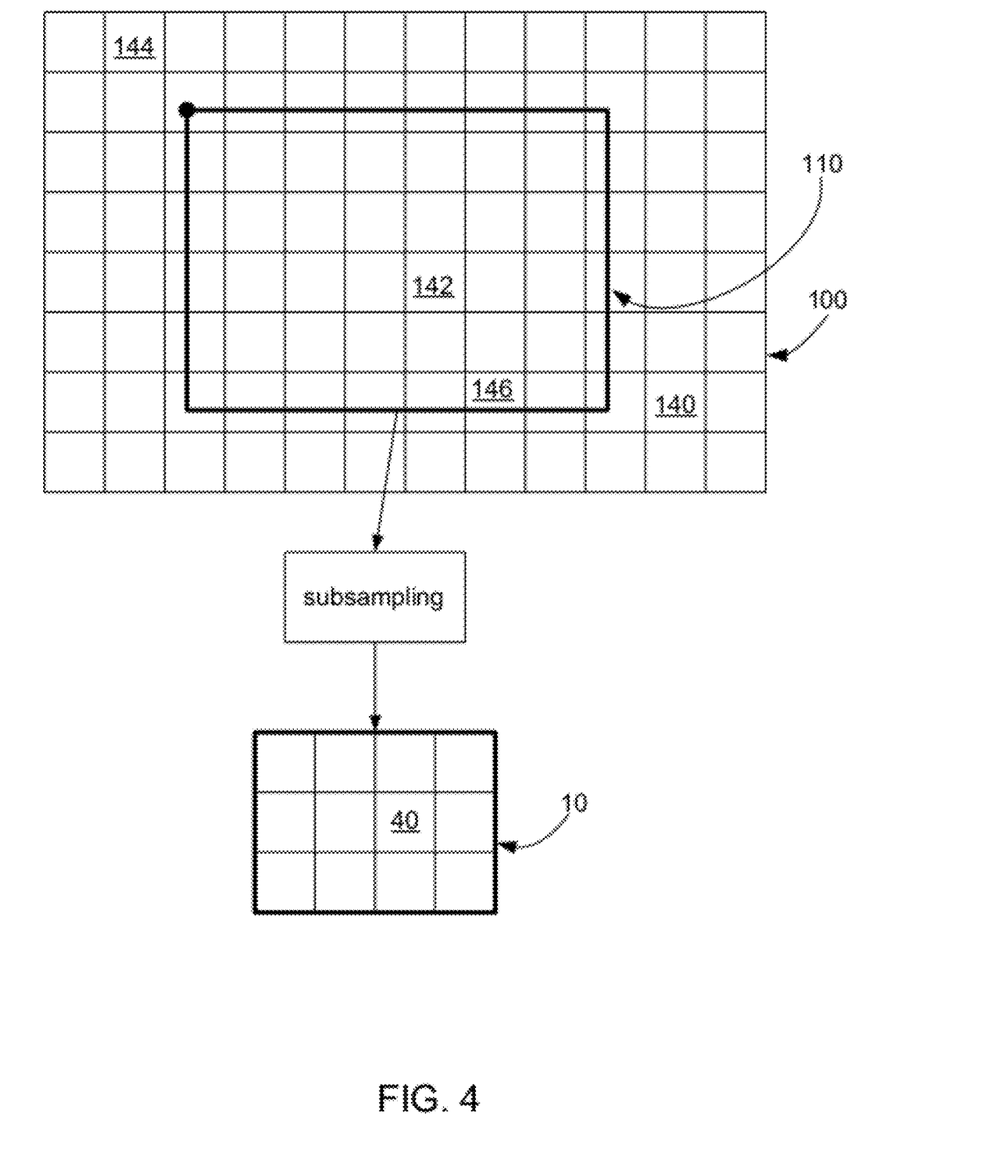
FIG. 4 is a diagram illustrating the relationship between macroblocks in an enhancement layer and a base layer.

FIG. 4 shows the same geometry as that shown in FIG. 1 with an overlay of macroblocks. An exemplary macroblock in the enhancement spatial layer 100 may be shown by 140. An exemplary macroblock in the base spatial layer 10 may be shown by 40. A macroblock 142 in the enhancement spatial layer 100 may be entirely within the cropped region 110. A macroblock 144 in the enhancement spatial layer 100 may be entirely outside the cropped region 110. A macroblock 146 in the enhancement spatial layer 100 may be in both the cropped region 110 and outside of the cropped region 110.

Figure 5:
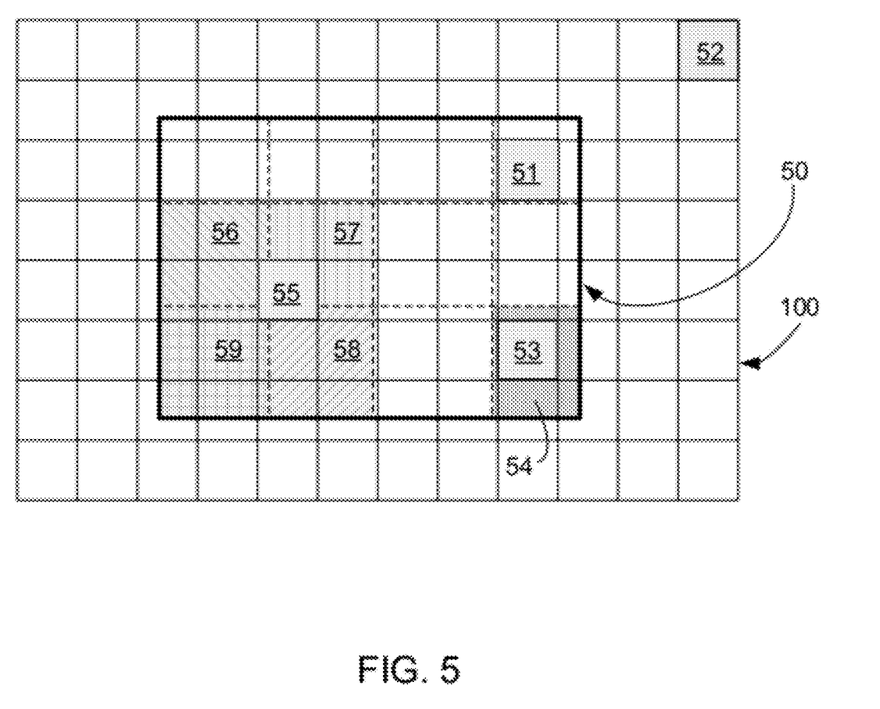
FIG. 5 is a diagram illustrating the relationship between macroblocks in an enhancement layer and a base layer.

FIG. 5 shows an exemplary overlay of the macroblocks of the up-sampled base spatial layer 50 on the enhancement spatial layer 100. The dashed lines show the up-sampled base spatial layer macroblocks. Block 51 is an exemplary up-sampled macroblock from the base spatial layer. Some macroblocks, for example 52, in the enhancement spatial layer 100 have no base spatial layer corresponding block. Other macroblocks in the enhancement spatial layer 100, have one to several corresponding base spatial layer macroblocks. Block 53 in the enhancement spatial layer 100 has one corresponding block, 54, in the base spatial layer. Block 55 in the enhancement spatial layer 100 has four corresponding blocks, base spatial layer blocks 56, 57, 58, and 59, in the base spatial layer.

An exemplary embodiment of an interpolation process of the present invention compatible with the SVC extension of H.264/MPEG-4 AVC is described in the following steps:

Define position (xP, yP) for the upper-left luma sample of a macroblock in the enhancement picture. When chroma_format_idc is not equal to 0, i.e., the chroma channels exist, define position (xC, yC) for the upper-left chroma samples of the same macroblock.

Derive the relative location of the luma macroblock in the luma base-layer picture, ($p_{x,L}$, $p_{y,L}$), using:

$$\begin{cases} xB = p_{x,L}(xP) >> 4 \\ yB = p_{y,L}(yP) >> 4 \end{cases}$$

$$\begin{cases} xB1 = (p_{x,L}(xP+15)+15) >> 4 \\ yB1 = (p_{y,L}(yP+15)+15) >> 4 \end{cases}$$

where $$\begin{cases} p_{x,L}(x) = \left[(x - x_{orig}) \cdot w_b \cdot R_L + \frac{R_L}{2}(w_b - w_{ex})\right] // w_{ex} \\ p_{y,L}(y) = \left[(y - y_{orig}) \cdot h_b \cdot R_L + \frac{R_L}{2}(h_b - h_{ex})\right] // h_{ex} \end{cases}$$

as described above with $R_L$=16. When chroma_format_idc is not equal to 0, derive the relative location of the chroma macroblock in the chroma base-layer picture, ($p_{x,C}$, $p_{y,CL}$), using:

$$\begin{cases} xCB = p_{x,C}(xC) >> 4 \\ yCB = p_{y,C}(yC) >> 4 \end{cases}$$

$$\begin{cases} xCB1 = (p_{x,C}(xC + MbWidthC - 1) + 15) >> 4 \\ yCB1 = (p_{y,C}(yC + MbHeightC - 1) + 15) >> 4 \end{cases}$$

in which MbWidthC and MbHeightC represent the number of chroma samples per macroblock (MB) in the horizontal and vertical directions, respectively. And given a chroma sample position $(x_c, y_c)$ in the enhancement picture in units of single chroma samples, its corresponding position in the base picture $(p_{x,c}, P_{y,c})$ in units of one-sixteenth chroma samples of the base picture can be derived as:

$$\begin{cases} p_{x,c}(x_c) = \left[(x_c - x_{orig,c}) \cdot w_{b,c} \cdot R_C + \frac{R_C}{4}(2 + p_{enh,x})w_{b,c} - \frac{R_C}{4}(2 + p_{base,x})w_{ex,c}\right] // w_{ex,c} \\ p_{y,c}(y_c) = \left[(y_c - y_{orig,c}) \cdot h_{b,c} \cdot R_C + \frac{R_C}{4}(2 + p_{enh,y})h_{b,c} - \frac{R_C}{4}(2 + p_{base,y})h_{ex,c}\right] // h_{ex,c} \end{cases}$$

in which $R_C=16$, $(x_{orig,c}, y_{orig,c})$ represents the position of the upper-left corner of the cropping window in the current picture in units of single chroma samples of current picture, $(w_{b,c}, h_{b,c})$ is the resolution of the base picture in units of single chroma samples of the base picture, $(w_{ex,c}, h_{ex,c})$ is the resolution of the cropping window in units of the single chroma samples of current picture, $(p_{base,x}, p_{base,y})$ represents the relative chroma phase shift of the base picture in units of quarter chroma samples of the base picture, and $(p_{enh,x}, p_{enh,y})$ represents the relative chroma phase shift of the current picture in units of quarter chroma samples of the current picture.

Texture Interpolation Process: Prediction
  Inputs to this process include:
    integer luma sample positions in base picture (xB, yB) and (xB1, yB1),
    a luma sample array for the base picture $base_L[x, y]$ with $x=-2+xB$ . . (xB1+2) and $y=-2+yB$ . . (yB1+2),
    when chroma_format_idc is not equal to 0,
      integer chroma sample positions in base picture (xCB, yCB) and (xCB1, yCB1),
      two chroma sample arrays for the base picture $base_{Cb}[x, y]$ and $base_{Cr}[x, y]$ with $x=-2+xCB$ . . (xCB1+2) and $y=-2+yCB$ . . .(yCB1+2).
  Outputs of this process include:
    a luma sample macroblock array $pred_L[x, y]$ with $x=0 \ldots 15$ and $y=0 \ldots 15$,
    when chroma_format_idc is not equal to 0, two chroma sample macroblock arrays $pred_{Cb}[x, y]$ and $pred_{Cr}[x, y]$ with $x=0$ . . MbWidthC-1 and $y=0$ . . MbHeightC-1.
  The luma samples $pred_L[x,y]$ with $x=0 . . 15$ and $y=0 \ldots 15$ are derived as follows.
    Let $temp_L[x, y]$ with $x=-2+xB \ldots (xB1+2)$ and $y=0 \ldots 15$ be a temporary luma sample array.
    Each $temp_L[x, y]$ with $x=-2+xB \ldots (xB1+2)$ and $y=0 \ldots 15$ is derived as follows:
      The corresponding fractional-sample position yf in base layer is derived as follows:

$yf = p_{y,L}(y+yP)$.

Let yInt and yFrac be defined as follows:

$y\text{Int} = (yf >> 4)$ and $y\text{Frac} = yf \% 16$.

Select a six-tap filter e[j] with $j=-2 \ldots 3$ from Table 1 using yFrac as phase, and derive $temp_L[x, y]$ as:

$temp_L[x, y] = base_L[x, y\text{Int}-2]*e[-2] + base_L[x, y\text{Int}-1]*e[-1] + base_L[x, y\text{Int}]e[0] + base_L[x, y\text{Int}+1]*e[1] + base_L[x, y\text{Int}+2]*e[2] + base_L[x, y\text{Int}+3]*e[3]$.

Each sample $pred_L[x, y]$ with $x=0 . 15$ and $y=0 . 15$ is derived as follows:
  The corresponding fractional-sample position xf in base layer is derived as follows:

$xf = p_{x,L}(x+xP)$.

Let xInt and xFrac be defined as follows:

$x\text{Int} = (xf >> 4)$ and $x\text{Frac} = xf \% 16$.

Select a six-tap filter e[j] with $j=-2 \ldots 3$ from Table 1 using xFrac as phase, and derive $pred_L[x, y]$ as:

$pred_L[x, y] = Clip1_Y((temp_L[x\text{Int}-2, y]*e[-2] + temp_L[x\text{Int}-1, y]*e[-1] + temp_L[x\text{Int}, y]*e[0] + temp_L[x\text{Int}+1, y]*e[1] + temp_L[x\text{Int}+2, y]*e[2] + temp_L[x\text{Int}+3, y]*e[3] + 512)/1024)$, with $Clip1_Y(x) = \min(\max(0, x), (1 << BitDepth_Y)-1)$ in which $BitDepth_Y$ represents the bit depth of the luma channel data.

When chroma_format_idc is not equal to 0, the chroma samples $pred_C[x, y]$ (with C denoting each Cb and Cr) with $x=0 \ldots$ MbWidthC-1, $y=0 \ldots$ MbHeightC-1 are derived as follows.
  Let $tmp1_{Cb}[x, y]$ and $tmp1_{Cr}[x, y]$ with $x=-2+xCB \ldots (xCB1+2)$ and $y=0 \ldots$ MbHeightC-1 be temporary chroma sample arrays.
  Each $temp_C[x, y]$, with C as Cb and Cr, $x=-2+xCB \ldots (xCB1+2)$, and $y=0 \ldots$ MbHeightC-1 is derived as follows:
    The corresponding fractional-sample position yfC in base layer is derived as follows:

$yfC = p_{y,C}(y+yC)$.

Let yIntC and yFracC be defined as follows:

$y\text{Int}C = (yfC >> 4)$ and $y\text{Frac}C = yfC \% 16$.

Select a six-tap filter e[j] with $j=-2 \ldots 3$ from Table 1 using yFracC as phase, and derive $temp_C[x, y]$ as:

$temp_C[x, y] = base_C[x, y\text{Int}C-2]*e[-2] + base_C[x, y\text{Int}C-1]*e[-1] + base_C[x, y\text{Int}C]e[0] + base_C[x, y\text{Int}C+1]*e[1] + base_C[x, y\text{Int}C+2]*e[2] + base_C[x, y\text{Int}C+3]*e[3]$.

Each sample $pred_C[x, y]$ with C as Cb and Cr, $x=0 \ldots$ MbWidthC-1 and $y=0 \ldots$ MbHeightC-1 is derived as follows:
  The corresponding fractional-sample position xfC in base layer is derived as follows:

$xfC = p_{x,C}(x+xC)$.

Let xIntC and xFracC be defined as follows $x\text{Int}C = (xfC >> 4)$ and $x\text{Frac}C = xfC \% 16$.

Select a six-tap filter e[j] with $j=-2 \ldots 3$ from Table 1 using xFracC as phase, and derive $pred_C[x, y]$ as $pred_C[x, y] = Clip1_C((temp_C[xIntC-2, y]*e[-2] + temp_C[xIntC-1, y]*e[-1] + temp_C[xIntC, y]*e[0] + temp_C[xIntC+1, y]*e[1] + temp_C[xIntC+2, y]*e[2] + temp_C[xIntC+3, y]*e[3] + 512)/1024)$, with $Clip1_C(x) = min(max(0, x), (1 << BitDepth_C) - 1)$ in which $BitDepth_C$ represents the bit depth of the chroma channel data.

Texture In Interpolation Process: Residual

Inputs to this process include:
integer luma sample positions in base picture, basePic, (xB, yB) and (xB1, yB1),
a luma residual sample array $resBase_L[x, y]$ with x=−xB . . . xB1 and y=yB . . . yB1,
when chroma_format_idc is not equal to 0,
  integer chroma sample positions in base picture, basePic, (xCB, yCB) and (xCB1, yCB1),
  two chroma residual sample arrays $resBase_{Cb}[x, y]$ and $resBase_{Cr}[x, y]$ with x=xCB . . . xCB1 and y= yCB . . . yCB1.

Outputs of this process include:
a luma sample array $resPred_L[x, y]$ with x=0 . . . 15 and y=0 . . . 15.
when chroma_format_idc is not equal to 0, two chroma sample arrays $resPred_{Cb}[x, y]$ and $resPred_{Cr}[x, y]$ with x=0 . . . MbWidthC−1 and y=0 . . . MbHeightC−1.

The luma residual samples $resPred_L[x, y]$ with x=0 . . . 15 and y=0 . . . 15 are derived as follows.
Let $temp_L[x, y]$ with x=xB . . . xB1 and y=0 . . . 15 be a temporary luma sample array.
Each $temp_L[x, y]$ with x=xB . . . xB1 and y=0 . . . 15 is derived as follows:
  The corresponding fractional-sample position yf in base layer is derived as follows:

$yf = p_{y,L}(y + yP)$.

Let yInt and yFrac be defined as follows:

$yInt = (yf >> 4)$ and $yFrac = yf \% 16$.

Derive $temp_L[x, y]$ as $temp_L[x, y] = resBase_L[x, yInt]*(16 - yFrac) + resBase_L[x, yInt+1]*yFrac$.

Each residual sample $resPred_L[x, y]$ with x=0 . . . 15 and y=0 . . . 15 is derived as follows:
  The corresponding fractional-sample position xf in base layer is derived as follows:

$xf = p_{x,L}(x + xP)$.

Let xInt and xFrac be defined as follows:

$xInt = (xf >> 4)$ and $xFrac = xf \% 16$.

Derive $resPred_L[x, y]$ as $resPred_L[x, y] = (temp_L[xInt, y]*(16 - xFrac) + temp_L[xInt+1, y]*xFrac)/256$.

When chroma_format_idc is not equal to 0, the chroma residual samples $resPred_C[x, y]$ (with C being Cb or Cr) with x=0 . . . MbWidthC−1, y=0 . . . MbHeightC−1 are derived as follows.
Let $tmp1_{Cb}[x, y]$ and $tmp1_{Cr}[x, y]$ with x=xCB . . . xCB1 and y=0 . . . MbHeightC−1 be temporary chroma sample arrays.

Each $temp_C[x, y]$ with C as Cb and Cr, x=xCB . . . xCB1, and y=0 . . . MbHeightC−1 is derived as follows:
  The corresponding fractional-sample position yfC in base layer is derived as follows:

$yfC = p_{y,C}(y + yC)$.

Let yIntC and yFracC be defined as follows:

$yIntC = (yfC >> 4)$ and $yFracC = yfC \% 16$.

Derive $temp_C[x, y]$ as $temp_C[x, y] = resBase_C[x, yIntC]*(16 - yFracC) + resBase_C[x, yIntC+1]*yFracC$.

Each sample $resPred_C[x, y]$ with C as Cb and Cr, x=0 . . . MbWidthC−1 and y=0 . . . MbHeight−1 is derived as follows:
  The corresponding fractional-sample position xfC in base layer is derived as follows:

$xfC = p_{x,C}(x + xC)$.

Let xIntC and xFracC be defined as follows:

$xIntC = (xfC >> 4)$ and $xFracC = xfC \% 16$.

Derive $resPred_C[x, y]$ as $resPred_C[x, y] = (temp_C[xIntC, y]*(16 - xFracC) + temp_C[xIntC+1, y]*xFracC)/256$.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for picture up-sampling from a base-layer picture comprising base-layer image samples, $base_L[\bullet, \bullet]$, to an enhancement-layer picture comprising enhancement-layer image samples, $pred_L[\bullet, \bullet]$, comprising:
  defining a position, (xP, yP), for an upper-left sample of a block of said enhancement-layer picture;
  deriving a relative location, xB, yB, xB1, yB1, of said block of said enhancement-layer picture in said base-layer picture; and
  producing a sample block array, $pred_L[x, y]$, wherein said producing comprises:
    forming a temporary sample array, $temp_L[x, y]$;
    deriving an entry in said temporary sample array, wherein said deriving comprises:
      calculating a corresponding fractional-sample y-position, yf, in said base-layer picture;
      calculating a y-position interpolation center, yInt, based on yf;
      calculating a y-position phase based on yf;
      obtaining a first set of filter coefficients for a first six-tap filter, wherein said obtaining of said first set of filter coefficients is based on said y-position phase; and
      deriving said entry $temp_L[x, y]$ according to:

$temp_L[x, y] = base_L[x, yInt-2]*e[-2] + base_L[x, yInt-1]*e[-1] + base_L[x, yInt]*e[0] + base_L[x, yInt+1]*e[1] + base_L[x, yInt+2]*e[2] + base_L[x, yInt+3]*e[3]$, wherein e[−2], e[−1], e[0], e[1], e[2], and e[3] represent said first set of filter coefficients for said first six-tap filter; and deriving an entry in said sample block array, $pred_L[x, y]$, wherein said deriving comprises:

calculating a corresponding fractional-sample x-position, xf, in said base-layer picture;

calculating an x-position interpolation center, xInt, based on xf;

forming an x-position phase based on xf;

obtaining a second set of filter coefficients for a second six-tap filter, wherein said obtaining of said second set of filter coefficients is based on said x-position phase; and deriving said entry $pred_L[x, y]$ according to:

$pred_L[x, y]$=Clip1$_y$(( temp$_L$[xInt−2, y]*e[−2]+temp$_L$[xInt−1, y]*e[−1]+temp$_L$[x, yInt]*e[0]+temp$_L$[xInt+1, y]*e[1]+temp$_L$[xInt+2, y]*e[2]+temp$_L$[xInt+3, y]*e[3]+512)/1024), wherein e[−2], e[−1], e[0], e[1], e[2], and e[3] represent said second set of filter coefficients for said second six-tap filter.

2. The method of claim 1 further comprising defining an interpolation resolution.

3. The method of claim 2, wherein said interpolation resolution is 1/16 (one-sixteenth) of an image sample.

4. The method of claim 1, wherein said base-layer image samples comprise luminance samples.

5. The method of claim 1, wherein said base-layer image samples comprise chrominance samples.

6. The method of claim 1, wherein said obtaining of said first set of filter coefficients comprises accessing a look-up-table.

7. The method of claim 6, wherein said look-up-table comprises samples of a Lanczos-windowed sinc function.

8. The method of claim 1, wherein said obtaining of said second set of filter coefficients comprises accessing a look-up-table.

9. The method of claim 8, wherein said look-up-table comprises samples of a Lanczos-windowed sinc function.

10. The method of claim 1, wherein said block is a macroblock of dimension 16 by 16.

11. The method of claim 1, wherein said block has the same spatial dimensions as said enhancement-layer picture.

* * * * *